M. L. DUNHAM.
METHOD OF PRODUCING PISTON RINGS.
APPLICATION FILED OCT. 19, 1916.
1,219,270.
Patented Mar. 13, 1917.
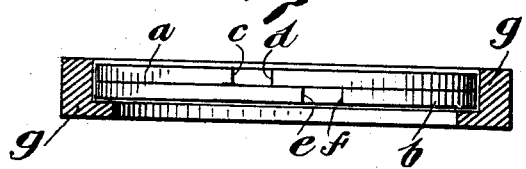
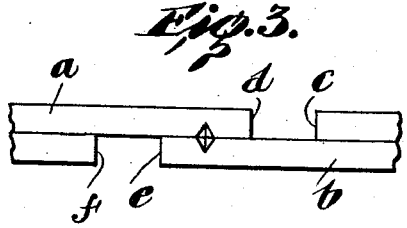
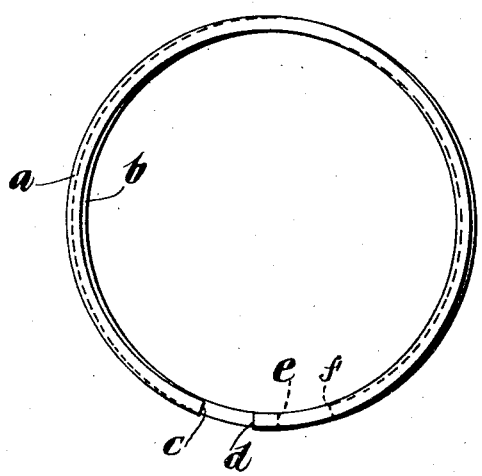
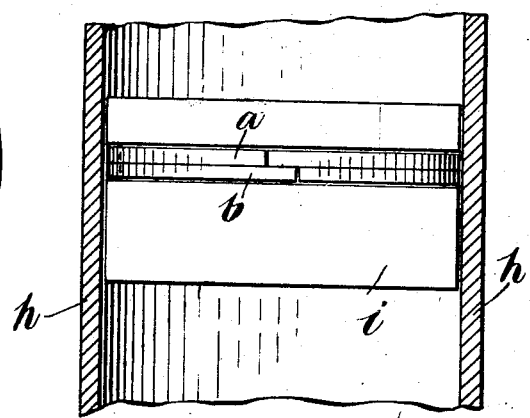
Inventor
Millard L. Dunham,
By his Attorney

UNITED STATES PATENT OFFICE.

MILLARD L. DUNHAM, OF NEW YORK, N. Y., ASSIGNOR TO DUNHAM PISTON RING COMPANY INC., OF NEW YORK, N. Y., A CORPORATION OF NEW YORK.

METHOD OF PRODUCING PISTON-RINGS.

1,219,270.   Specification of Letters Patent.   Patented Mar. 13, 1917.

Application filed October 19, 1916. Serial No. 126,480.

*To all whom it may concern:*

Be it known that I, MILLARD L. DUNHAM, a citizen of the United States, and resident of the borough of Manhattan, in the city, county, and State of New York, have invented certain new and useful Improvements in Methods of Producing Piston-Rings, of which the following is a specification.

This invention relates to a new method of manufacturing piston rings of the character disclosed in my previous Patent No. 1,103,-912; wherein two split rings, in superposed relation, are united near adjacent, opposite end portions.

The separated ring members, in that patent, were connected when in eccentric relation, and unrestrained.

My present improvement comprises a step in the manufacturing process whereby a pair of divided oversize ring members, of the same dimensions, and in superposed relation, are contracted to a reduction from their circumferential extent in a free state, and then united together at adjacent ends, to comprise a continuous spiral or helix.

The extent to which said ring members are contracted may be intermediate their circumferential areas, in a free state, and as contracted for cylinder service.

As practised by me this step is accomplished by partially contracting the ring members to an extent whereby their circumferential area lies within the areas circumscribed by said rings in a free state and as contracted for service.

The purpose of the partial contraction aforesaid is that the ring members may be united, as by brazing, welding or otherwise, when in that state; to thereby create a union of said ring members which will impart to the unified ring approximately equal radial tension, all around its circumference, under the condition of the further service contraction of its members.

In the drawing:—

Figure 1 is a side elevation of a pair of separate ring members arranged one upon the other, and in a free state.

Fig. 2 is a similar view of the ring members, partly contracted, as in a concentric form, for the purpose of uniting them at their ends.

Fig. 3 is a partial inner peripheral view of the ring members in the form, showing their adjacent engaging ends, with alined cuts for brazing material.

Fig. 4 is a plan view of the ring, as formed, and in a free state, and

Fig. 5 is a side elevation of a formed ring contracted to fit in a cylinder in which it is shown.

The several steps involved in the manufacture of duplex piston rings, according to my improved method, consist in first taking a pair of ring members $a$ $b$, cylindrical in contour, and of equal size,—composed of cast iron or other suitable material,—and each divided to leave the respective opposed ends, $c$ $d$ and $e$ $f$, separated, when the ring members are in a non-contracted state, by spaces of the extent, for example, represented in Fig. 1.

The ring members are then contracted partially, as by placing them, one upon the other, in a mold or form $g$ having a receiving concentric wall slightly less in diameter than the outside diameter of the non-contracted rings. The relative diminution in size of the ring members, shown in Fig. 2, may serve as an example of the approximate extent of contraction desirable in the performance of this step of my invention. While thus contracted, the ring members $a$ and $b$ are united together as by welding, soldering or brazing.

The connection is effected between adjacent ends of the two ring members, as by the securing of end $d$ upon end $e$, which thus closes said ends. Hence I may term the ring ends $e$, $d$, the closed ends, in contradistinction to the ends $c$, $f$, which I may term the free ends.

Having formed the piston ring in the manner stated, and removed it from the form $g$, the free ends will expand, respectively, at opposite portions of the ring, as is obvious, in eccentric form. This is because the free ends, when unrestrained, expand in opposite outward spirals, using the closed ends as a sort of fulcrum or center of expansion. Now, if the ring be contracted to a greater extent than to fit the form $g$, as for instance to close the joints or spaces between the ends of the ring members, for service in a cylinder; then, in that act, the free ends of the ring members, throughout, will undergo an inward spiral movement, while the closed ends are held stationary, or nearly so; and the effect produced by this further contraction is to allow the ring, in service, to exert equal, or approximately equal, outward tension at all parts of its peripheral bearing, as against the confining wall of a cylinder h. By way of illustration, the ring is shown, in Fig. 5, as fitting in a groove in piston i, within cylinder h.

It is important that the ring members be only partly contracted at the time of connecting their ends, because by that means proper coördination of outward tension (when in a further contracted state) is provided between the closed and free ends or portions of the ring.

For example, if the ring were contracted to the limit, and its ends then connected, the result would be that the closed ends would exert less outward tension than the free ends. If, on the other hand, the ring members were connected while they were wholly unconfined, and in concentric relation; then, upon contracting the ring its free ends would exert less outward tension than the closed ends.

I claim:—

1. The method of producing a piston ring having two, equal sized, split ring members, which consists in arranging said members in superposed relation and contracted to a circumferential dimension within the circumference of said members in a free state, and then in uniting adjacent, opposite ends of said ring members while so contracted, whereby the ring, in cylinder service, exerts approximately equal radial tension throughout its circumference.

2. The method of producing a piston ring having two, equal sized, split ring members, which consists in arranging said members in superposed relation and contracted to a circumferential dimension which is intermediate the circumferential dimensions of said members, in a free state, and as suited for cylinder service; and then in uniting adjacent, opposite ends of said ring members while so contracted, whereby the ring, when further contracted for cylinder service, exerts approximately equal radial tension throughout its circumference.

Signed at the borough of Manhattan, in the city, county and State of New York.

MILLARD L. DUNHAM.

Witnesses:
F. W. BARKER,
L. MOSKOWITZ

Copies of this patent may be obtained for five cents each, by addressing the "Commissioner of Patents, Washington, D. C."